Figure 1:
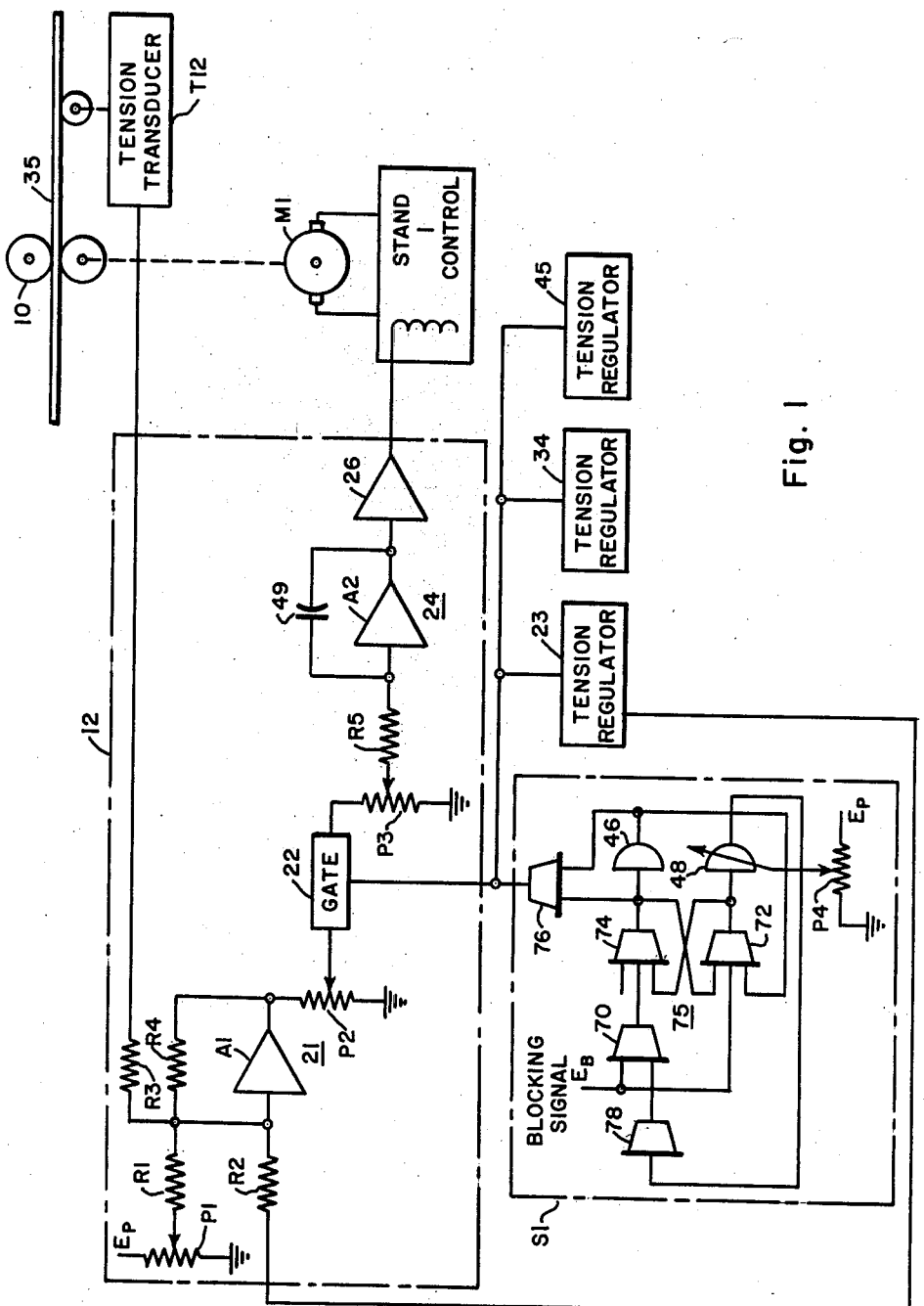

June 15, 1965     J. W. WALLACE     3,188,841

MULTISTAND SAMPLING TENSION REGULATING SYSTEM

Filed March 16, 1962     2 Sheets-Sheet 1

WITNESSES

INVENTOR
John W. Wallace
BY
ATTORNEY

United States Patent Office  3,188,841
Patented June 15, 1965

3,188,841
MULTISTAND SAMPLING TENSION REGULATING SYSTEM
John W. Wallace, Pitcairn, Pa., assignor to Westinghouse Electric Corporation, East Pittsburgh, Pa., a corporation of Pennsylvania
Filed Mar. 16, 1962, Ser. No. 180,205
5 Claims. (Cl. 72—9)

In general, this invention relates to a multistand sampling tension regulating system. More particularly, it relates to a system for controlling the tension between stands of a strip rolling mill or the like wherein the actual tension between stands is compared to a reference desired tension and using an integrating type regulator is fed into each stand main control to maintain the tension between stands constant.

To control the strip tension, the torque of one stand may be controlled with respect to an adjacent stand. A tensiometer measures the tension between the two stands and this tension signal is used to control at least one of the two stands. Any difference between the tensiometer output and a reference setting is a tension error. This error acts on a tension regulator to cause it to feed a corrective signal to the stand control involved. The stand control may be a voltage regulator, speed regulator or any other common control used on stand drive motors. In previous systems, the tension regulator has been a proportional continuous type regulator. In this type of regulator, the error signal is continuously fed to the stand control. Stability and accuracy are a problem in such regulators. This is so because the error signal from the tensiometer does not change immediately the ouptut of the stand drive motor as the response time of the stand drive motor is slow.

It is a general object of the invention to avoid and overcome the foregoing and other difficulties of, and objections to, prior art practices by the provision of a more accurate sampling or ON-OFF type regulator which applies a tension correction and then waits until the effect is measured before allowing a further correction if needed.

Another object is to provide a more stable tension regulator for the control of a multistand rolling mill.

Another object is to provide a better sampling type tension regulator for a multistand rolling mill which utilizes a master sampling controller to cycle all the stand drives in unison.

Another object is to provide a more efficient multistand tension control system in which control signals are transmitted from one stand control to another in order to anticipate a change in the torque of a given stand motor.

Figure 2:
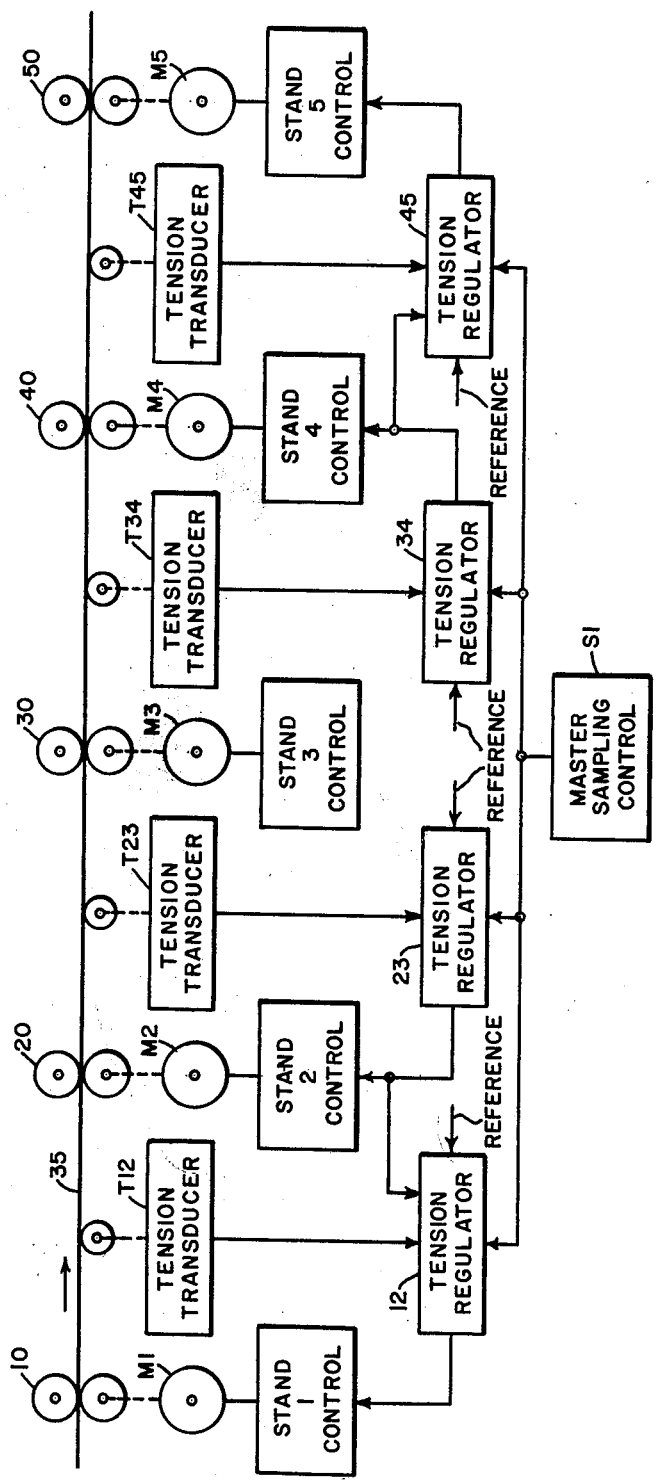

Still further objects and the entire scope of applicability of the present invention will become apparent from the detailed description given hereinafter; it should be understood however that the detailed description while indicating preferred embodiments of the invention is given by way of illustration only since various changes and modifications in the spirit and scope of the invention will become apparent to those skilled in the art from this detailed description. The apparatus of the invention will become more readily apparent by reference to the attached drawings, in which:

FIGURE 1 is a schematic showing of the tension control of stand No. 1 of a five stand rolling mill, and FIGURE 2 is a diagrammatic showing of a multistand tension control scheme in accordance with the principles of the present invention.

In FIGURE 1, there is shown a rolling mill 10 including an upper roller and a lower roller operative with the strip 35 of metal which passes through the first stand 10 of the rolling mill to the second stand 20 of the rolling mill. A strip tension measuring device T12 is operative to provide an output signal in accordance with the tension on this strip between the first stand 10 and the second stand 20 of the rolling mill through a resistor R3 to a summing amplifier 21. The summing amplifier 21 is an operational amplifier A1 with resistive feedback consisting of resistor R4. A tension reference signal is obtained from a potentiometer P1 energized from a pattern source Ep, through a resistor R1 to an input of the operational amplifier A1. The difference between the voltage input to the amplifier A1 from the potentiometer P1 and the strip tension measuring device T12 is a tension error signal. A third signal from tension regulator 23 through resistor R2 to the amplifier A1 will be discussed with respect to FIGURE 2. The operational amplifier 21 as well as the operational amplifier 24 to be discussed hereinafter are such as are described in the book "Electronic Analog Computers" by Granino A. Korn and Theresa M. Korn, McGraw-Hill Book Company, 1952.

The output signal from the amplifier 21 is fed through the variable potentiometer P2 to the gate device 22 which is, per se, well known in the art and is operative to pass the error signal when the gate device is open and to block the passage of the error signal when the gate device is closed. When the gate device 22 is open as will be described later, the error signal is supplied to integrating circuit 24 through a resistor R5. The integrating circuit 24 consists of an operational amplifier A2 with a capacitor 49 in its feedback group. The integrating amplifier 24 is similar to a motor operated rheostat driven by a variable speed motor. The rheostat will move whenever the motor receives an input signal, but when the input to the motor is removed the rheostat retains the position in which it is left. Thus, the ouput signal is held when the input is removed. If the input voltage to the rotor is large, the motor will move the rheostat rapidly. Hence a larger output will be reached more rapidly than if a lesser input were supplied. The integrating circuit 24 operates in exactly the same manner, but is a static device. Thus, the larger the input error the faster the output correcting signal will build up. When the error is removed completely, by the gate becoming non-conductive, the output will be held at the final value. It will be held at this value until changed by a new error or by resetting action of the control. Thus, the regulating system is what is known as a "zero-error" system, as an input error is not needed to sustain the correction signal. The output of the integrating amplifier 24 is fed through a power amplifier 26 to a strip tension control for stand No. 1. This stand No. 1 control is operative with the motor M1 to change the torque of the first stand 10 of the rolling mill. In this regard, the stand No. 1 control may be a well known magnetic amplifier type of variable voltage motor control, for example, with the error signal from the power amplifier 26 being supplied to a control winding of a magnetic amplifier for thereby varying the operative speed of the motor M1 in accordance with the value of the control signal suplied by the amplifier 26. In this way, the tension of the strip 35 betwene the first stand 10 and the second stand 20 of the rolling mill is varied. Such a tension controller can be found in U.S. Patent 2,715,702, issued August 16, 1955, to A. J. Winchester, Jr.

The sampling system of the present invention uses two timers which continually cycle the tension control ON and OFF. During the ON time the error gate 22 is switched to a conducting condition and the integrating amplifier 24 adjusts tension quickly in response to any error that is present. The length of the ON time is fixed by the ON timer 46. When it is timed out, a signal appears on the output of the ON timer 46 that initiates the OFF timer 48. During the OFF time, the error gate 22 is switched off and the integrating amplifier remains at the output level set by the last previous ON cycle. The length of the OFF time is controlled by a signal proportional to the response of the mill motor or can be a fixed value. When the OFF timer is timed out, the error gate again switches to the conductive condition and the cycle repeats. The integrator is allowed to receive a signal only during the ON time. Note that the integrator responds to the actual error and its output at the end of the ON time is dependent on the value of the error during the ON time. This provides a correction proportional to error which allows a maximum rate of correction to be used. The rate of correction of a given error is set by the integration constant of the integrating amplifier 24 and is set to correct as precisely as practical the total error in one ON time. The OFF timer holds the circuit from releasing the ON time until it is timed out. At that time, the ON timer is released and another ON period takes place. This ON and OFF sampling system is controlled by the master sampler S1 which includes the ON timer 46 and the OFF timer 48. A blocking signal E$b$ from a suitable source that could be manually controlled is used to set the master sampling control S1 in operation. When there is a zero value signal supplied by the blocking signal E$b$, the master sampling control S1 is ready for operation.

The master controller S1 is operative to open the gate device 22 through the illustrated NOR logic circuitry for a predetermined time interval as determined by the ON timer 46. The operation of the ON timer 46 when it stops its timing operation after a provided ON time period causes the OFF timer 48 to begin its timing operation and to hold the gate device 22 in its closed state of operation for an OFF time interval dependent upon the signal supplied from the pattern source E$p$ through a potentiometer P4 or in the alternative to a signal dependent upon the operating speed of the rolling mill.

The operation of a NOR logic device per se is believed to be well known to persons skilled in this art. The NOR logic device provides a unit value output signal until at least one of its inputs receives a unit value input signal in which case the NOR logic device provides a zero value output signal.

Thus, when the blocking signal E$b$ provides a zero value output signal, the NOR device 70 provides a unit value output signal. This allows the NOR device 74 to provide a zero value output signal. The zero value output signal from the NOR device 74 causes the NOR device 72 of the FLIP-FLOP circuit 75 to have a unit value output signal. The zero value signal of the NOR device 74 causes the NOR device 76 to have a unit value output signal, since its second input as energized by the output of the ON timer is now also energized by a zero value input signal. The unit value output signal from the NOR device 76 causes the gate device 22 of the tension regulator 12 as well as the corresponding gate device 22 in the tension regulators 23, 34 and 45 shown in FIGURE 2 to open and thereby allow the passage of the error signal from the output of the preamplifier 21 to the integrating circuit 24. The zero value output circuit from the NOR device 74 starts the operation of the ON timer 46. After a predetermined ON time interval as initially set for the ON timer 46, the ON timer provides a unit value output signal which is supplied to an input of the NOR device 76 to thereby terminate its unit value output signal and thusly close the gate device 22.

The unit value output signal from the ON timer 46 also causes the NOR device 72 to have a zero value output signal which starts the OFF timer 48 to provide a zero value output signal. The OFF timer 48 provides a unit value output signal until its input is energized by the NOR device 72 providing a unit value output signal. After a predetermined time, the OFF timer 48 again provides a unit value output signal to the input of the NOR device 78. The zero value control signal from the OFF timer 48 causes the NOR device 78 to have a unit value output signal to in turn cause the NOR device 70 to have a zero value output signal and the NOR device 74 to have a unit value output signal to further block the NOR device 76. Note that the unit value output signal from the ON timer 46 causes the NOR device 76 to have a zero value output signal which is operative to block or close the gate devices 22 of the tension regulators 12, 23, 34 and 45.

Thusly, it will be seen that the gate device 22 was in this manner open for a time period determined by the ON timer 46 providing a zero value output signal and further the gate 22 is held closed for a time period determined by the OFF timer 48. The OFF timer 48 is responsive to the voltage set on the potentiometer P4 or in the alternative by a signal proportional to the response of the mill motor.

The ON timer 46 and the OFF timer 48 are per se well known devices readily available to persons skilled in the art. The control apparatus as shown in FIGURE 1 provides a correction proportional to the actual tension error and which allows a maximum rate of correction to be used. The rate of correction of a given error is determined by the integration constant of the integrating circuit 24 and the ON time of the ON timer 46. The integration constant is set to correct as precisely as is practical the total error in one ON time period, and the OFF timer 48 holds the circuit from resetting the ON timer until one period preferably in accordance with mill motor response time is over. At that time the ON timer is reset and ready for another correction cycle. Several correction operations are possible depending upon the magnitude of the tension errors existing. However, the integrator circuit 24 will probably reach an excessive error correction now and then in the course of its operation. When it does reach such an excessive tension limit, a voltage detector device, not shown, responsive to the signal at the output of the tension regulator could be inserted to provide an output signal to permit a screwdown control to be energized to bring the tension controller within limits. Thusly, the tension corrections are made solely in a substantially static manner without mechanical movement of the screwdown apparatus by varying the tension of the strip between the stands. However, the screwdown motor can be employed for keeping the individual tension regulators within the limits of the tension regulators. The blocking signal E$b$ could be used to prevent operation of the tension control system when the tension error signals from the outputs of the preamplifiers 21 of all the tension regulators 12, 23, 34 and 45 are below a preset minimum value.

FIGURE 2 shows the application of the sample tension control of the present invention to a five stand strip rolling mill. Stands 10, 20, 30, 40 and 50 are driven by motors M1, M2, M3, M4 and M5. The motors M1 through M5 are controlled by the stand No. 1 through No. 5 controllers respectively. A tensiometer T12 placed between stand 10 and stand 20 feeds the tension regulator 12 described with reference to FIGURE 1. The tension regulator 12 has its own tension reference and is connected to the master sampling control S1. The output of the tension regulator 12 controls the stand No. 1 controller. A tensiometer T23 between the second stand 20 and the third stand 30 feeds a similar tension regulator 23 having its own tension reference to control stand No. 2. The stand No. 3 controller is constant and the third stand 30 acts as a pivot for the five stand system. The tensiometer P34 feeds the tension regulator 34 having its own tension reference, to control the stand No. 4 controller. Similarly, tensiometer T45, placed between the fourth stand 40 and the fifth stand 50, feeds the tension regulator 45 having its own tension reference to control the stand No. 5 controller. The tension regulators 12, 23, 34 and 45 are all connected to the master sampling control S1.

The control signal from the tension regulator 23 and the control signal from tension regulator 34 are anticipation signals to the end stand tension regulators 12 and 45, respectively. These anticipation signals are used so that the end stands 10 and 50 will respond along with the inner stands 20 and 40 to eliminate delay of the tension regulators 12 and 45 having to pick up the change effected in the second and fourth stands 20 and 40. It will be obvious to one skilled in the art that this mode of operation can be modified to mills with other than five stands. The master sampling control S1 is used to cycle the system in unison rather than each tension regulator having its own. It is felt that this will keep one regulator from adversely disturbing the adjacent regulator as probably would happen if each were allowed to cycle without regard to the other.

One best known embodiment of the invention has been illustrated and described in detail. It is to be particularly understood that the invention is not limited thereto or thereby.

I claim as my invention:

1. In a system for controlling the tension between pairs of stands of a multistand strip rolling mill, the combination of tension sensing means each being operative with the strip between a differing pair of said stands to sense and supply respective signals proportional to the deviation from a desired tension on the strip between each pair of stands, tension control means each including a signal integrating device and being responsive to a different one of said signals, with each of said tension control means being operative to control at least one stand of a different pair of stands for each of said tension deviation signals, and time control means operative to simultaneously control all of said tension control means to make operative and to make inoperative at periodic time intervals the respective tension sensing means and their associated tension control means relative to the controlled stands of the mill.

2. Tension control system of claim 1, wherein the tension deviation signal for a first pair of stands is additionally supplied to the tension control means for a second pair of stands for anticipating tension deviation correction, and where said first and second pairs of stands have one stand in common.

3. The strip tension control system of claim 1, wherein the periodic time intervals for making inoperative a given tension sensing means and its associated tension control means is in accordance with the response time of its controlled mill stand.

4. In a system for controlling the tension between the stands of a five stand strip rolling mill, the combination of four tension sensing means each being adapted to be placed between a different pair of adjacent stands and operative separately to sense and supply a signal proportional to the deviation in the tension on the strip between its own pair of stands from a given reference value, control means for keeping constant the speed of the third stand, four tension control means each being responsive to the integral of a different one of said signals and being operatively connected respectively to the first, second, fourth and fifth stands to control the latter said stands, and time control means operative to simultaneously control each of said four tension control means to periodically connect and disconnect the respective tension control means from their associated tension sensing means.

5. The five stand tension control system of claim 4, wherein the tension deviation signal operative to control the second stand is also used to control the first stand and the tension deviation signal operative to control the fourth stand is also used to control the fifth stand.

References Cited by the Examiner

UNITED STATES PATENTS

| 2,883,895 | 4/59 | Vossberg | 80—56 |
| 2,933,626 | 4/60 | Giboney et al. | 80—56.3 |
| 2,949,799 | 8/60 | Walker | 80—35.1 |

OTHER REFERENCES

Control Engineering, September 1956, pages 116 and 117.

WILLIAM J. STEPHENSON, *Primary Examiner.*

LEON PEAR, *Examiner.*